United States Patent
Arroyo et al.

(10) Patent No.: US 7,550,220 B2
(45) Date of Patent: Jun. 23, 2009

(54) MINIATURE FUEL CELL BASE MODULE COMPRISING MICRO-VOLUMES WHICH ARE TRAVERSED BY ONE OF TWO REACTANTS

(75) Inventors: Jean Arroyo, Meylan (FR); Didier Bloch, Biviers (FR); Jean-Yves Laurent, Claix (FR); Didier Marsacq, Grenoble (FR)

(73) Assignee: Commissariat A l'Energie Atomique, Paris (FR)

( * ) Notice: Subject to any disclaimer, the term of this patent is extended or adjusted under 35 U.S.C. 154(b) by 400 days.

(21) Appl. No.: 10/514,441

(22) PCT Filed: May 22, 2003

(86) PCT No.: PCT/FR03/01548

§ 371 (c)(1), (2), (4) Date: Nov. 15, 2004

(87) PCT Pub. No.: WO03/100895

PCT Pub. Date: Dec. 4, 2003

(65) Prior Publication Data
US 2005/0175881 A1   Aug. 11, 2005

(30) Foreign Application Priority Data
May 24, 2002   (FR)   .................................. 02 06350

(51) Int. Cl.
*H01M 2/00* (2006.01)
*H01M 2/02* (2006.01)

(52) U.S. Cl. ............................. 429/34; 429/31; 429/32; 429/44

(58) Field of Classification Search ................... 429/31, 429/32, 34, 44
See application file for complete search history.

(56) References Cited

U.S. PATENT DOCUMENTS
7,195,832 B2 *   3/2007   Lewin et al. .................. 429/31

FOREIGN PATENT DOCUMENTS
| DE | 199 14 681 A1 | 10/2000 |
| JP | 01163973 | 6/1989 |
| JP | 06188006 | 7/1994 |
| WO | 01/37357 A2 | 5/2001 |

OTHER PUBLICATIONS

Kelley, S.C., Deluga, G.A., Smyrl, W.H.; "A Miniature Methanol/Air Polymer Electrolyte Fuel Cell", Department of Chemical Engineering and Materials Science, Corrosion Research Center, University of Minnesota, Minneapolis, Minnesota 55455, USA, pp. 407-409.

* cited by examiner

*Primary Examiner*—Patrick Ryan
*Assistant Examiner*—Ben Lewis
(74) *Attorney, Agent, or Firm*—Pearne & Gordon LLP

(57) ABSTRACT

The basic module has a large functional surface area compared with its relatively small global surface area.

Figure 1:
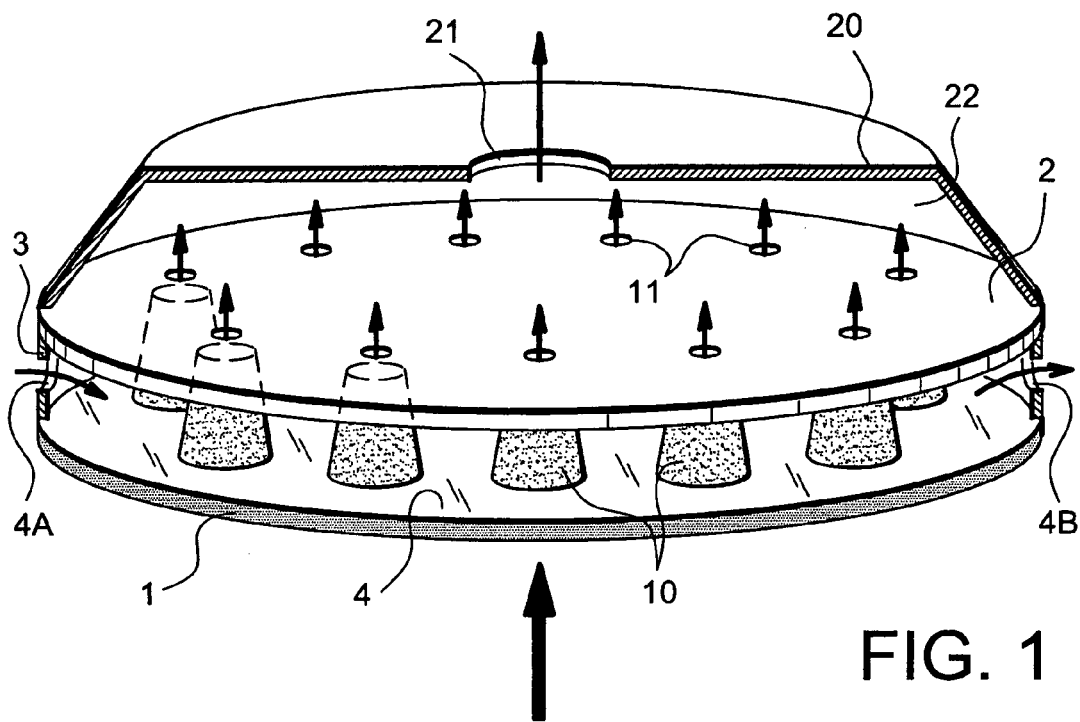

It is composed mainly of a multitude of micro-volumes (10, 110) installed in a closed space between a lower border (1), upper border (2) and side border (3). Each micro-volume wall is covered with a layer forming the membrane/electrodes basic element. Circulation of a first reactant to pass inside each micro-volume (10, 110) is enabled, whereas circulation of a second reactant to pass inside each micro-volume (10, 110) is enabled. The space between the micro-volumes (10, 110) may possibly be filled in with a porous material to stiffen the assembly.

Applications for small sized fuel cells.

10 Claims, 2 Drawing Sheets

MINIATURE FUEL CELL BASE MODULE COMPRISING MICRO-VOLUMES WHICH ARE TRAVERSED BY ONE OF TWO REACTANTS

FIELD OF THE INVENTION

This invention relates to the field of small fuel cells, although it could be applied to medium power fuel cells. In particular, it relates to small micro-systems or modules forming fuel cells that will be used as portable energy microsources. It is also equally applicable to ion exchanging membrane cells operating with the hydrogen/oxygen pair known as PEMFC (Protons Exchange Membrane Fuel Cell), and cells using the methanol/oxygen pair known as DMFC (Direct Methanol Fuel Cell).

PRIOR ART AND PROBLEM THAT ARISES

Fuel cells are electrochemical cells usually composed of a stack of stages producing electrical energy. Each stage comprises an anode and a cathode each placed on each side of another electrolyte usually composed of a membrane. A different reactant, namely a fuel and an oxidant, arrives on each of the outside surfaces of these two electrodes. These react chemically through the electrolyte, so that it is possible to take off an electrical voltage at the terminals of the two electrodes.

For medium power fuel cells, a "filter/press" type assembly is frequently used to combine two-pole graphite plates or stainless steel plates with electrode/membrane/electrode assemblies obtained by pressing two fabric electrodes and one proton conducting membrane. However, concerning the production of small cells and micro-cells (0.5 to 50 W), the development of new architectures and processes may be used, particularly using microelectronics technologies.

Several basic module architectures are known in which a thin plate of porous silicon is used on which an electrically conducting material is deposited followed by a catalyst and a membrane, then a catalyst again and a conducting material to form the electrode/membrane/electrode assembly.

Furthermore, a team at the Lawrence Livermore National Laboratory has produced a fuel micro-cell basic cell, using a silicon substrate. The first step is to deposit a thin metallic layer of nickel on it acting as an electronic collector, followed by the catalyst and then the proton conductor. Nickel is then perforated by chemical etching to bring the catalyst and the reducer into contact.

Finally, international patent WO-97/11503 and American patent U.S. Pat. No. 5,759,712 describe a fuel cell architecture, the operation of which is based on the use of a microporous material impregnated with a proton conductor as the central area of a fuel micro-cell module. The other materials forming the fuel cell are deposited on each side of this substrate using conventional vacuum deposition techniques.

All these architectures of fuel cell modules are plane and cannot give a sufficiently large electrode surface area to produce the necessary electrical power, to supply electronic devices of portable units with energy. Therefore the purpose of this invention is to overcome this disadvantage.

Furthermore, it is known that one of the reactant gases can be made to transit through a porous material, for example a porous silicon, in a plane-shaped cell.

PRESENTATION OF THE INVENTION

The main purpose of the invention is a miniature fuel cell module composed mainly of:

several micro-volumes, held fixed with respect to each other by a structure and each comprising a stack of at least three layers comprising an anode, an electrolyte and a cathode, each micro-volume having two parts uncovered by the three layers at the two ends;

first means of circulation of a first reactant to pass inside each micro-volume; and second means of circulation of a second reactant outside the micro-volumes.

It is very advantageous to consider that the inside of the micro-volumes is made of a material permeable to the first reactant.

In that case, it is preferable to choose porous silicon.

In the main embodiment of the invention, the structure is composed of two lower and upper borders impermeable to the two reactants and between which the micro-volumes are located, these two borders being drilled at the ends of the micro-volumes, thus forming part of the first means of circulation of the first reactant.

In that case, the second means of circulation of the second reactant are composed partly of a side border impermeable to at least the second reactant, surrounding the assembly, and comprising at least one inlet orifice, the space between the micro-volumes being left free.

In another preferred embodiment of the second means of circulation of the second reactant, these means are completed by a reinforcement of the porous material filling the spaces between each of the micro-volumes.

It is advantageous if the side border of the module is composed of a silicon ring.

In a first embodiment of the first means for distributing the first reactant, the lower border is composed of a distributing substrate covered by a layer between the micro-volumes that is leak tight to the two reactants.

In a second embodiment, the distributing substrate comprises a hollow base.

In both of these cases, the first reactant may be collected through a collection space placed above the upper border of the assembly.

It is advantageous to use the first and second means of circulating the first and second reactants, together with means of applying a slight positive pressure on the upstream side of the micro-volumes or on the upstream side of the inlet hole of the first means of circulating a first reactant, or means of creating a slight negative pressure on the downstream side of the micro-volumes or an outlet hole of the second means of circulating the second reactant.

One particularly special embodiment of the basic module according to the invention comprises several micro-volume stages, each stage being separated from the other by an intermediate border each provided with circulation holes placed at the top of the micro-volumes, the upper border itself also being provided with circulation holes at the top of the micro-volumes, each stage being provided with a side border itself provided with at least one inlet hole.

LIST OF FIGURES

Figure 2:
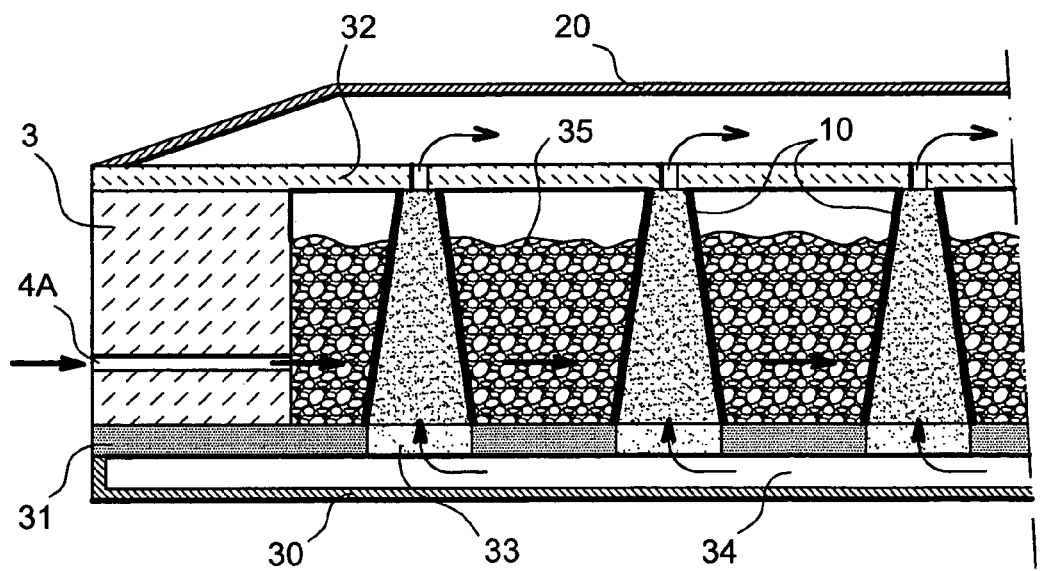
Figure 3:
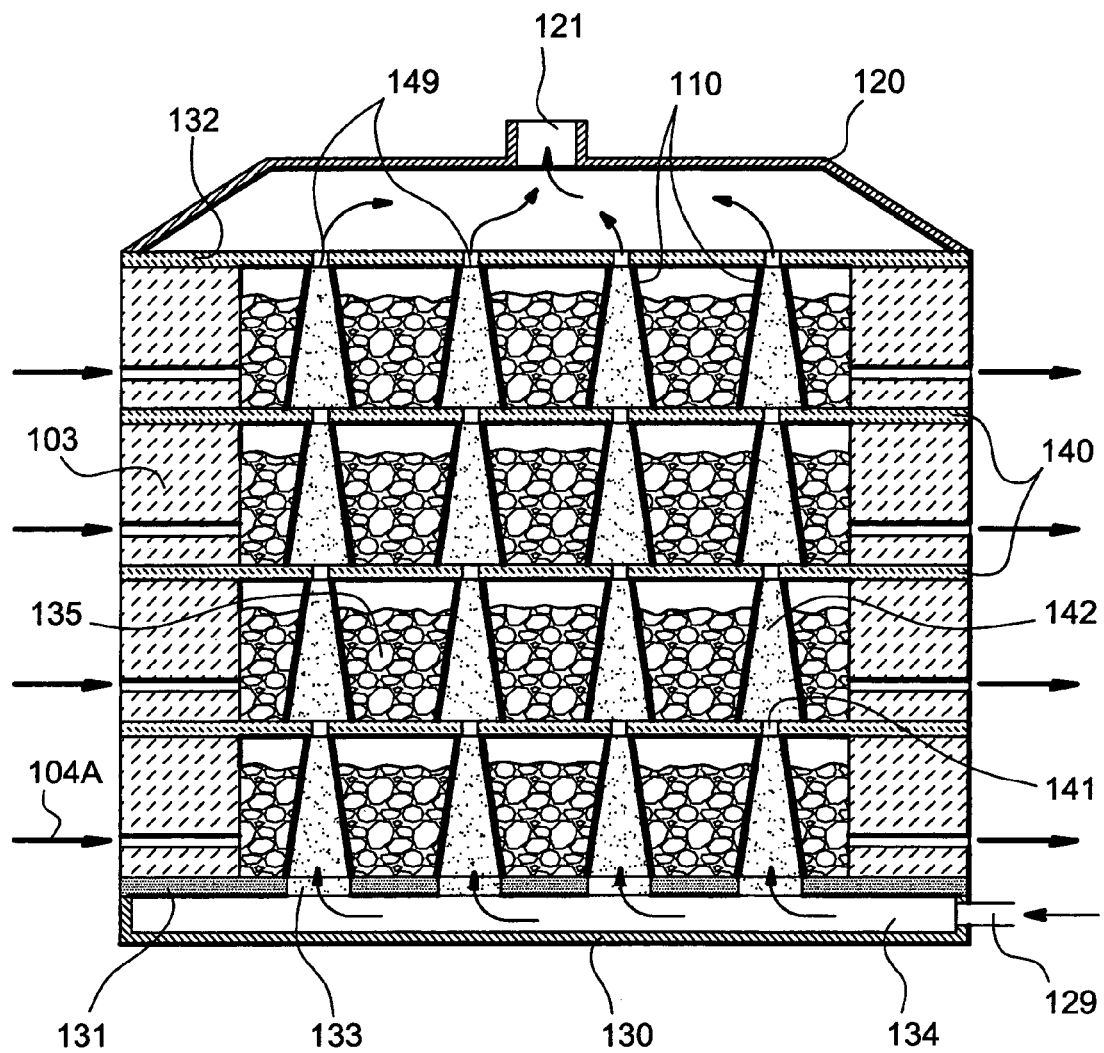

The invention and its various technical characteristics will be better understood after reading the following description which is accompanied by two figures, showing the following:

FIG. 1, a first possible embodiment of the module according to the invention;

FIG. 2, a sectional view showing a second possible embodiment of the module according to the invention; and FIG. 3, a sectional view showing a third possible embodiment of the module according to the invention.

DETAILED DESCRIPTION OF TWO EMBODIMENTS OF THE INVENTION

With reference to FIG. 1, the principle of the module according to the invention is to use a large number of micro-volumes within a small thickness, the walls of which are covered with a multi-layer forming the basic membrane/electrode elements of the fuel cell. Circulation of a first reactant is organized inside each micro-volume to come into contact with one of the two electrodes of the multi-layer deposited on the micro-volume, while circulation of a second reactant is organized around each of the micro-volumes to come into contact with the other electrode of each basic element thus formed. The membrane is leak tight to the two reactants.

The main elements of the module shown in this FIG. 2 are a lower base 1 and an upper base 2 between which a multitude of micro-volumes 10 is installed. The assembly is surrounded by a side border 3 that delimits a flattened circular space between the lower border 1 and the upper border 2. This circular shape is not functional, so that any other shape could be used (rectangle, square, etc.). Circulation of a first reactant is organized on the inside of each of the micro-volumes 10, as shown diagrammatically by the vertical arrows. Consequently, the surface of the lower border 1 is made to be leak tight to the two reactants on its face, except on surfaces delimited by the base of each of the micro-volumes 10. Consequently, since this lower border 1 is composed of a porous material enabling circulation of the first reactant, this reactant may be transferred entirely or partly by the lower border 1 as far as the base of each micro-volume 10. Secondly, in the case of the module shown in this FIG. 1, the assembly is completed by a cap 20 above the assembly and fixed to the periphery of the upper border 2, so as to delimit a collection space 22 in which the first reactant that has just passed through each of the micro-volumes 10 opens up. The top border 2 is designed to be leak tight to the two reactants, except on part of the surface corresponding to the top end of each of the micro-volumes 10. An outlet suction hole 21 is formed in the cap 20 to organize the circulation of the second reactant. However, the outlet hole is not compulsory since the reactant is consumed during the reaction.

Indeed, the module according to the invention is provided with first means of recirculating the first reactant to force circulation of this reactant inside the module, as shown diagrammatically by the vertical arrows.

Furthermore, a second circulation of a second reactant is organized inside the closed space thus defined between the lower border 1, the upper border 2 and the side border 3, between the micro-volumes 10. This circulation is forced through an inlet hole 4A formed on one side of the side border 3 and an outlet hole 4B formed in the same side border 3, on the opposite side of the inlet hole 4A. The two horizontal arrows diagrammatically show this circulation of the first reactant. However, the outlet hole 4B is not compulsory, since this second reactant may be consumed during the reaction.

Any device controlling a slight overpressure on the upstream side of the inlet hole 4A or capable of creating a negative pressure on the downstream side of the outlet hole 4B may be used to organize this second circulation. Similarly, it would be possible to use means of creating a positive pressure on the upstream side of the lower border 1, in other words below it, and/or means of creating a slight negative pressure at the outlet from the collection outlet hole 21.

In this figure, the micro-volumes 10 are shown as having a conical shape. This is simply one example embodiment, other shapes could be used to form these micro-volumes 10.

The porous material forming the lower border 1 may also be used to form the inside of micro-volumes.

The side border 3 may preferably be made using a silicon ring, at the same time as the construction of a structure of micro-volumes 10.

The means envisaged for producing this type of cell module may be to use a material leak tight to the two reactants, for example laminated films impermeable to these two reactants. Once drilled at the locations corresponding to the ends of the micro-volumes, these films may be applied to the internal surface of the lower border 1 and to at least one of the surfaces of the upper border 2.

Furthermore, one or several photosensitive dry films can be used to make holes in the lower border 1 and upper border 2, at the end of the micro-volumes 10, by insolation. Furthermore, the size of the holes then formed in the upper plate 2 is smaller than the size at the top of each micro-volume.

With reference to FIG. 2, the first means of circulating the first reactant may be different on the upstream side of the micro-volumes 10. The lower border 31 of the first embodiment may be composed of a plate leak tight to the two reactants over its full thickness and through which holes 33 corresponding to the bottom surface of each micro-volume are drilled. Thus, by putting a hollow base underneath the lower border 31, delimiting a distribution space 34 with the lower border 31, it is possible to bring the first reactant inside the micro-volumes 10. The first reactant is at a slightly higher pressure inside this distribution space 34, therefore it may pass through the inside of each micro-volume 10 from bottom to top. In order to sustain each micro-volume 10, it is advantageous if the holes 33 in the lower border 31 are filled with a porous material equivalent to the material used to fill the inside of the micro-volumes 10.

It is also interesting to fill the space left free between the lower border 1 and the upper border 2 of the first embodiment shown in FIG. 1, by a porous infill material 35 such as a polymer, so as to mechanically reinforce the assembly and particularly the strength of the micro-volumes 10. This type of porous material may be deposited in the form of spheroidal plastic pellets, for example polystyrene balls, followed by heating to weld these different pellets or balls. The porosity of these filling materials 35 thus installed enables the second reactant to circulate inside the internal space between the lower border 31 and the upper border 32 from an inlet hole 4A towards an outlet hole reference 4B, in FIG. 1.

With reference to FIG. 3, a special embodiment of the basic module according to the invention consists of making several stages in which micro-volumes 10 are each placed on the same plane. Each of the stages has a lateral border 103, provided with an inlet hole 104A and possibly an outlet hole 104B. Each stage is separate from the upper or lower stage by an intermediate border 130 provided with holes 149 opening up at the top of each of the micro-volumes 110. Since the lower border 131 is also provided with inlet holes 133 at the bottom of each micro-volume 110, and the upper border 132 itself is provided with outlet holes 149 at the top of the micro-volumes 110, it can be understood that circulation of a first reactant alone inside the micro-volumes 110 may be organized. This is done in a manner similar to the embodiment described above, using an inlet of the first reactant 129 opening up into a distribution space 134 formed by a hollow base 130. There is a cover 120 on which an outlet suction hole 121 is formed on the top of the stack.

Advantageously, each micro-volume 110 may be used with a porous material 135 such as porous silicon.

The invention claimed is:

1. Miniature fuel cell basic module composed mainly of several micro-volumes (10, 110), held fixed with respect to each other by a structure, and each comprising a stack of at least three layers forming an anode, an electrolyte and a cathode respectively, each micro-volume (10, 110) having two parts uncovered by the three layers at the two ends;

first means of circulation of a first reactant to pass inside each micro-volume; and second means of circulation of a second reactant outside the micro-volumes, wherein the structure is composed of two borders, the lower border (1, 31, 131) and the upper border (2, 32, 132) impermeable to the two reactants and between which the micro-volumes (10, 110) are located, these two borders being drilled at the ends of the micro-volumes, thus forming part of the first means of circulation of the first reactant, wherein the second means of circulation of the second reactant are composed partly of a side border (3, 103) impermeable to at least the second reactant, surrounding the assembly, and wherein the side border (3) is composed of a silicon ring.

2. Basic module according to claim 1, characterized in that the inside of the micro-volumes (10, 110) is filled with of a material permeable to the first reactant.

3. Basic module according to claim 2, characterized in that the material permeable to the first reactant is made of porous silicon.

4. Basic module according to claim 1, characterized in that the side border (3,103) comprises at least one inlet orifice (4A, 104A), the space between the micro-volumes being left free.

5. Basic module according to claim 4, characterized in that the second means of circulation of the second reactant are used together with a reinforcement of the porous material (35, 135) filling the spaces between each of the micro-volumes (10, 110).

6. Basic module according to claim 1, characterized in that the lower border (1) is composed of a substrate distributing the first reactant and is covered by a layer between the micro-volumes (10, 110) that is leak tight to the two reactants.

7. Basic module according to claim 6, characterized in that the distributing substrate comprises a hollow base (30, 130).

8. Basic module according to claim 1, characterized in that the first means of circulating a first reactant comprise also a collection space (22) placed above the upper border (2, 32, 132), formed of a cover (20, 120) to collect the first reactant on the downstream side of the micro-volumes (10, 110).

9. Basic module according to claim 1, characterized in that the first and second means of circulating the first and second reactants are used together with means of applying a slight positive pressure on the upstream side of the micro-volumes (10, 110) and of the inlet hole (4A) and/or means of creating a slight negative pressure on the downstream side of the micro-volumes (10, 110) and of the outlet hole (4B).

10. Basic module according to claim 1, wherein each stage of the several micro-volume (10, 110) stages is separated from the other by an intermediate border (140) each provided with circulation holes (149) located at the top of the micro-volumes (10, 110), like the upper border (132), each stage being provided with a side border (103) itself provided with at least one inlet hole (104A).

* * * * *